United States Patent
Pinkerton et al.

(10) Patent No.: US 7,341,703 B2
(45) Date of Patent: Mar. 11, 2008

(54) MIXED HYDROGEN GENERATION MATERIAL

(75) Inventors: Frederick E Pinkerton, Shelby Township, MI (US); Martin S Meyer, Southfield, MI (US); Gregory P Meisner, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 443 days.

(21) Appl. No.: 10/789,899

(22) Filed: Feb. 27, 2004

(65) Prior Publication Data

US 2005/0191236 A1 Sep. 1, 2005

(51) Int. Cl.
*C01B 21/092* (2006.01)
*C01B 3/04* (2006.01)

(52) U.S. Cl. .................................. 423/413; 423/648.1
(58) Field of Classification Search ................ 423/644, 423/645, 646, 647, 658.2, 413
See application file for complete search history.

(56) References Cited

U.S. PATENT DOCUMENTS

| | | | | |
|---|---|---|---|---|
| 4,007,257 | A | 2/1977 | Lemieux et al. | 423/646 |
| 6,015,041 | A | 1/2000 | Heung | 206/70 |
| 6,159,538 | A | 12/2000 | Rodriguez et al. | 427/213.31 |
| 6,267,229 | B1 | 7/2001 | Heung | 206/0.7 |
| 6,329,076 | B1 | 12/2001 | Kawabe et al. | 428/656 |
| 6,342,198 | B1 | 1/2002 | Zaluska et al. | 423/658.2 |
| 6,419,764 | B1 | 7/2002 | Kamiya et al. | 148/422 |
| 6,432,379 | B1 | 8/2002 | Heung | 423/648.1 |
| 6,444,361 | B1 | 9/2002 | Komori et al. | 429/218.2 |
| 6,946,112 | B2 * | 9/2005 | Chen et al. | 423/645 |
| 6,967,012 | B2 * | 11/2005 | Meisner et al. | 423/413 |
| 7,029,649 | B2 * | 4/2006 | Meisner et al. | 423/658.2 |
| 2003/0113252 | A1 | 6/2003 | Chen et al. | 423/414 |
| 2003/0129122 | A1 | 7/2003 | Chen et al. | 423/447.3 |
| 2003/0129126 | A1* | 7/2003 | Chen et al. | 423/645 |
| 2004/0265222 | A1 | 12/2004 | Meisner et al. | 423/648.1 |
| 2005/0191236 | A1 | 9/2005 | Pinkerton et al. | 423/658.2 |
| 2005/0271581 | A1 | 12/2005 | Meyer et al. | 423/658.2 |
| 2006/0057049 | A1 | 3/2006 | Pinkerton et al. | 423/284 |

OTHER PUBLICATIONS

JCPDS X-Ray Database; pattern No. 80-2274—$Li_2BN_2$, no date.
JCPDS X-Ray Database; pattern No. 40-1166—$Li_3BN_2$, no date.
JCPDS X-Ray Database; pattern No. 16-273—$Li_3BN_2$, no date.
JCPDS X-Ray Database; pattern No. 00-007-0245—$Li_3AlN_2$, no date.
JCPDS X-Ray Database; pattern No. 00-036-1016—$\beta-Mg_3B_2N_4$, no date.
JCPDS X-Ray Database; pattern No. 00-044-1497—$Mg_3BN_3$, no date.
JCPDS X-Ray Database; pattern No. 00-042-0868—$Mg_3BN_3$, no date.
Pinkerton, et al., Bottling the Hydrogen Genie, The Industrial Physicist, pp. 20-23 (Feb./Mar. 2004).

(Continued)

*Primary Examiner*—Wayne A. Langel

(57) ABSTRACT

In one aspect, the invention provides a novel quaternary hydrogen storage composition having a hydrogenated state and a dehydrogenated state. Further, the present invention provides methods of storing hydrogen in a hydrogen storage composition, and methods of releasing hydrogen by reacting a nitride composition and a hydride composition.

50 Claims, 5 Drawing Sheets

OTHER PUBLICATIONS

Goubeau, et al., Uber ternäre Metall-Bornitride ,Zeitschrifte für anorganishe und allgewieine Chemic vol. 310, pp. 248-260 (1961), no date.

Juza, et al., Die ternären Nitride $Li_3AlN_2$ und $Li_3GaN_2$; Zeitschrifte für Anorganische Chemic vol. 257, pp. 13-25 (1948), no month.

Yamane, et al., Structure of a New Polymorph of Lithium Boron Nitride, $Li_3BN_2$, J. Solid State Chemistry, vol. 65 pp. 6-12 (1986), no month.

Yamane, et al., High- and Low- Temperature Phases of Lithium Boron Nitride, $Li_3BN_2$: Preparation, Phase Relation, Crystal Structure, and Ionic Conductivity, Journal of Solid State Chemistry, vol. 71, pp. 1-11 (1987), no month.

Cenzual, et al., Inorganic Structure Types with Revised Space Group., Acta Cryst. vol. B47, pp. 433-439 (1991), no month.

Villars, et al., ASM International Handbook of Ternary Alloy Phase Diagrams, Al Li N; $AlLi_3N_2$ (1) Crystallographic Data (1997), no month.

Villars, et al., ASM International Handbook of Ternary Alloy Phase Diagrams, B Li N; $BLi_3N_2$ (LT) (2) Crystallographic Data (1997), no month.

Villars, et al., ASM International Handbook of Ternary Alloy Phase Diagrams, B Li N; $BLi_3N_2$ (HT) (1) Crystallographic Data (1997), no month.

Villars, P, Pearson's Handbook Desk Edition; Crystallographic Data for Intermetallic Phases, $Ac-Cr_2Se_4Zr$, vol. 1, p. 416; p. 771; and p. 776 (1997), no month.

Cenzual et al., "Inorganic Structure Types with Revised Space Group", Acta Cryst., vol. B47 (1991) 433-439, no month.

Chen et al., "Hydrogen Storage in Metal Nitride Systems", Edited by Ricardo B. Schwartz, Symposium V, Materials for Energy Storage, Generation and Transport, vol. 730 (Apr. 2-4, 2002) 376 and 385.

Chen et al., "Interaction of Hydrogen with Metal Nitrides and Imides", Nature Publishing Group [vol. 420] (Nov. 21, 2002) 302-304 with Supplement pp. 1-6.

Goubeau, et al., "Uber ternäre Metall-Bornitride", Zeitschrifte für anorganishe und allgewieine, Chemic vol. 310 (1961) 248-260, no month.

Hu et al., "Ultrafast Reaction between LiH and $NH_3$ during $H_2$ Storage in $Li_3N$"; J. Phys. Chem. A; vol. 107, No. 46 (Nov. 20, 2003) 9737-9739.

Ichikawa et al., "Mechanism of Novel Reaction for LiNH and LiH to $Li_2NH$ and $H_2$ as a Promising Hydrogen Storage System"; J. Phys. Chem. B; vol. 108, No. 23 (May 5, 2004) 7887-7892.

Jacobs et al., "Preparations and Properties of Magnesium Amide and Imide", Journal for Anorganic and General Chemistry, Band [Vol.] 870 (1969) 254-261. (English translation only; original German not available), no month.

Juza et al., "Die ternären Nitride $Li_3AlN_2$ und $Li_3GaN_2$"; Zeitschrifte für Anorganische Chemic, vol. 257 (1948) 13-25, no month.

Juza et al., "Metal amides and metal nitrides", 25th Part, Journal for Anorganic and General Chemistry, 1951 vol. 266, 325-330. (English translation and German language document), no month.

Pinkerton et al., "Hydrogen Desorption Exceeding Ten Weight Percent from the New Quaternary Hydride $Li_3BN_2H_8$" ACS Publications, http://pubs.acs.org/cgi-bin/abstract.cgi/jpcbfk/2005/109/i01/abs/jp0455475.html, no month.

Pinkerton et al., "Bottling the Hydrogen Genie", The Industrial Physicist, (Feb./Mar. 2004) 20-23.

Yamane et al., "High- and Low-Temperature Phases of Lithium Boron Nitride, $Li_3BN_2$ Preparation, Phase Relation, Crystal Structure, and Ionic Conductivity", J. Solid State Chemistry, vol. 71, 1987) 1-11, no month.

* cited by examiner

MIXED HYDROGEN GENERATION MATERIAL

FIELD OF THE INVENTION

The present invention relates to hydrogen storage compositions, the method of making such hydrogen storage compositions and use thereof for storing hydrogen.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume of storage. Presently, this is done by conventional means such as storage under high pressure, at thousands of pounds per square inch, cooling to a liquid state, or absorbing hydrogen into a solid such as a metal hydride. Pressurization and liquification require relatively expensive processing and storage equipment.

Storing hydrogen in a solid material provides relatively high volumetric hydrogen density and a compact storage medium. Hydrogen stored in a solid is desirable since it can be released or desorbed under appropriate temperature and pressure conditions, thereby providing a controllable source of hydrogen.

Presently, it is desirable to maximize the hydrogen storage capacity or content released from the material, while minimizing the weight of the material to improve the gravimetric capacity. Further, many current materials only absorb or desorb hydrogen at very high temperatures and pressures. Thus, it is desirable to find a hydrogen storage material that generates or releases hydrogen at relatively low temperatures and pressures, and which has relatively high gravimetric hydrogen storage density.

Therefore, in response to the desire for an improved hydrogen storage medium, the present invention provides a method of storing and releasing hydrogen from storage materials, as well as improved hydrogen storage material compositions.

SUMMARY OF THE INVENTION

In one aspect, the present invention provides a hydrogen storage composition comprising: $M'_xM''_yN_zH_d$ wherein (a) M' is a cation selected from the group consisting of: Li, Ca, Na, Mg, K, Be, and mixtures thereof and x is greater than about 50 and less than about 53; (b) M" comprises a cation composition comprising a Group 13 element of the Periodic Table and y is greater than about 5 and less than about 34; (c) N is nitrogen and z is greater than about 16 and less than about 45; (d) H is hydrogen and in a fully hydrogenated state, d is greater than about 110 and less than about 177; and (e) wherein M', M", x, y, z, and d are selected so as to maintain electroneutrality.

Another aspect of the present invention provides a method of storing hydrogen comprising: reacting a nitride having one or more cations other than hydrogen with a hydride having one or more cations other than hydrogen. The reacting forms a hydrogen storage composition comprising hydrogen, nitrogen, and at least one of the one or more cations other than hydrogen derived from the nitride and derived from the hydride, respectively.

Another preferred embodiment of the present invention provides a method of releasing hydrogen comprising: reacting a hydrogen storage nitride composition having one or more cations other than hydrogen with a hydrogen storage hydride composition having one or more cations other than hydrogen, wherein the reacting releases hydrogen and forms one or more byproduct compounds comprising: nitrogen and at least one of the one or more cations other than hydrogen derived from the nitride composition and from the hydride composition, respectively.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
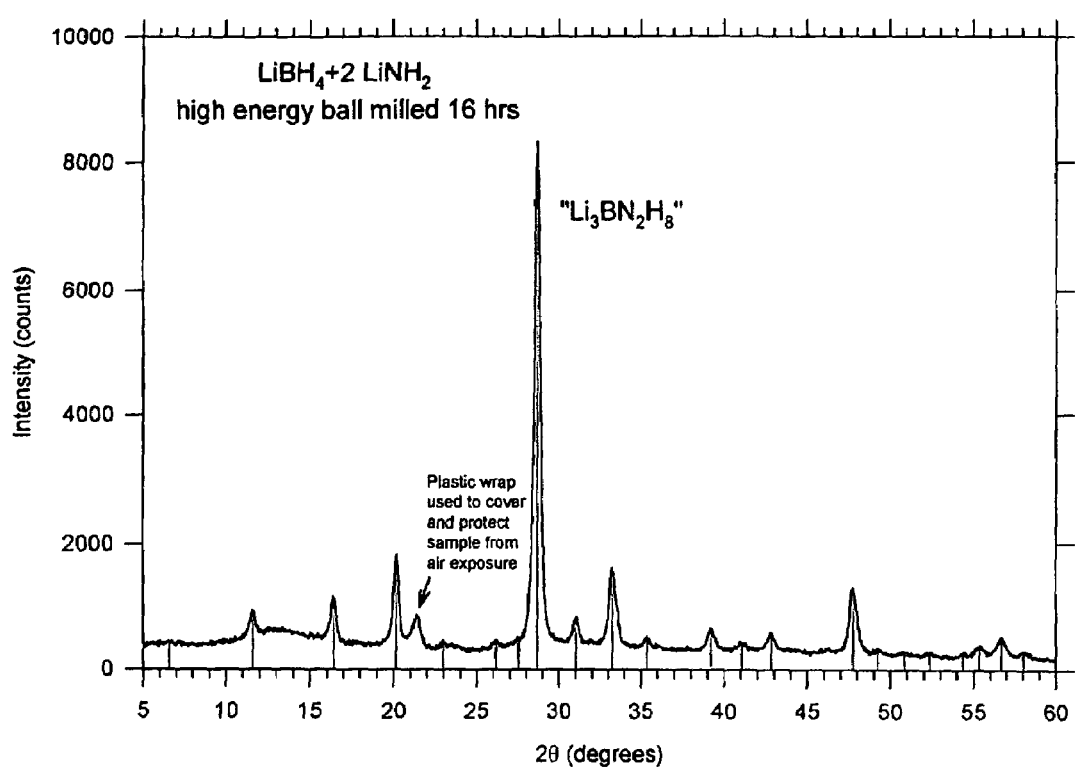
FIG. 1 shows a high-resolution x-ray diffraction pattern of a new quaternary hydrogen storage compound.

The following description of the preferred embodiment(s) is merely exemplary in nature and is in no way intended to limit the invention, its application, or uses.

In one aspect, the present invention provides a method of storing and releasing hydrogen. In one feature, a hydrogen storage material is formed by combining a nitride and a hydride, each of which are solids. The hydride is preferably represented by the general formula $MI^a(MIIH_b)_a$, where MI represents a first cationic species other than hydrogen, MII represents a second cationic species other than hydrogen, a represents an average valence state of MI and $$\left(\frac{a \times b}{1+a}\right)$$

represents an atomic ratio of hydrogen to cationic species (i.e., MI and MII) in the hydride compound. The nitride is preferably represented by the general formula $MIII^f(NH_e)_g^{-c}$, where MIII represents a cationic species other than hydrogen, N represents nitrogen, H represents hydrogen, f represents an average valence state of MIII, c=(3−e), $$g = \frac{f}{c} \text{ and } \left(\frac{e \times g}{1+g}\right)$$

represents the atomic ratio of hydrogen to cationic species (i.e., MIII, N) in the nitride compound. Thus, MI, MII, and MIII in both the hydride and the nitride respectively represent cationic species or a mixture of cationic species other than hydrogen.

A novel hydrogen storage composition material is formed as a stable intermediate (SI) in the reaction of the nitride with the hydride, as described above. As used herein, the term "composition" refers broadly to a substance containing at least the preferred chemical compound, but which may also comprise additional substances or compounds, including impurities. The term "material" also broadly refers to matter containing the preferred compound or composition. The formation of such a SI compound is dependent upon the individual chemical characteristics of the metal hydride and the nitride selected, and thus is most thermodynamically favored for certain preferred reactions. The SI hydrogen storage material is preferably in a solid phase form, and most preferably in a single solid phase form. The SI hydrogen storage composition preferably comprises hydrogen, nitrogen, and at least one of the one or more cations other than hydrogen derived from the nitride and derived from the hydride, respectively. The SI hydrogen storage composition further undergoes a decomposition reaction where the stored hydrogen is released. The products of this decomposition reaction are hydrogen and one or more byproduct compounds comprising nitrogen, and the one or more cations other than hydrogen derived from both the nitride compound and the hydride compound, respectively.

Thus, the present invention provides a method of storing hydrogen in a quaternary SI hydrogen storage composition. The reaction between the nitride and hydride compounds, described above, forms the stable quaternary intermediate (the novel hydrogen storage compound). Subsequent to the formation of the SI, hydrogen may be stored at ambient conditions in a stable form. When the release of hydrogen is desired, heat and/or pressure are applied to facilitate a decomposition reaction, where hydrogen gas is released from the quaternary SI hydrogen storage compound, and one or more decomposition byproducts are formed.

In another aspect, the present invention provides a method of releasing and generating hydrogen by reacting a nitride having one or more cations other than hydrogen with a hydride, also comprising one or more cations besides hydrogen. The nitride and hydride compounds react to release and form hydrogen and one or more byproduct compounds. In such methods of the present invention, the nitride and hydride react to directly produce hydrogen via reaction, rather than to form a stable intermediate. Whether the SI forms is related to the thermodynamics of each reaction, and appears not to form in some reactions, either due to the instability of any intermediate that may form, or because the reaction does not appear to produce any intermediate, but rather directly proceeds to the final reaction products (i.e., hydrogen and the one or more substantially dehydrogenated byproduct compounds).

Thus, in certain preferred embodiments, the present invention provides two distinct physical states, one where hydrogen is "stored" and another subsequent to hydrogen release. Where the starting reactants react without forming an SI, the hydrogenated storage state corresponds to the reactants (i.e., because a stable hydrogenated intermediate is not formed), and the byproduct compound(s) correspond to the dehydrogenated state.

It should be understood that in the present invention MI, MII, MIII of the nitride and hydride compounds, previously described, each represent a cationic species or mixture of cationic species other than hydrogen. Examples are metal cations, non-metal cations such as boron, and non-metal cations which are organic such as $CH_3$. Elements that form preferred nitrides, hydrides, and mixtures of cations in the type of compounds of the present invention are as follows. Preferred cationic species generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr), and organic cations including ($CH_3$) methyl groups.

Nitride compounds, as used herein, include nitrogen-containing compounds having one or more cationic species, as described above, and hydrogen. The term "nitride" broadly includes compounds comprising amides ($NH_2$ group), imides or nitrenes (NH group), and azides ($N_3$ group). For nitride compounds, preferred cationic species (MIII) comprise Al, B, Ca, Li, Na, K, Be, Sr and Mg. Particularly preferred nitride compounds according to the present invention comprise the following non-limiting examples, lithium amide ($LiNH_2$), sodium amide ($NaNH_2$), lithium nitride ($Li_3N$), borozane, also known as borane-ammonia complex, ($BNH_6$), lithium azide ($LiN_3$), magnesium amide ($Mg(NH_2)_2$), magnesium imide (MgNH), and mixtures thereof.

Metal hydride compounds, as used herein, include those compounds having one or more cations other than hydrogen, and may comprise complex metal hydrides, which include two or more distinct cations other than hydrogen (i.e. MI and MII are distinct cationic species), as previously described. Particularly preferred MI and MII cations for hydrides comprise cations selected from the group: Al, B, Ca, Li, Na, and Mg. In certain preferred embodiments, it is preferred that MI and MII are different species, forming the complex metal hydride. In certain embodiments, the metal hydride compound may have one or more cations that are selected from a single cationic species (i.e. MI and MII are the same cationic species). Preferred metal hydrides according to the present invention comprise the following non-limiting examples, lithium hydride (LiH), lithium aluminum hydride ($LiAlH_4$), sodium borohydride ($NaBH_4$), lithium borohydride ($LiBH_4$), magnesium borohydride ($Mg(BH_4)_2$) and sodium aluminum hydride ($NaAlH_4$).

It should be noted that MI, MII, and MIII are independently selected in both the nitride and metal hydride compounds, and each may be different, or any two or more may be the same, cationic species. In certain preferred embodiments according to the present invention, MI and MIII are the same cationic species in both the nitride and the metal hydride, however, it is within the scope of the present invention to have distinct cationic species for MI of the nitride and the MIII of the metal hydride. Further, MII may be the same as MI in the metal hydride, as previously discussed, creating a metal hydride with a single cationic species.

Thus, according to one preferred embodiment of the present invention, the general reaction for releasing hydrogen while reacting a nitride and metal hydride proceeds according to the following mechanism:

$$AMI^a(MIIH_b)_a + BMIII^f(NH_e)_g{}^{-c} \rightarrow MI_A MII_{(A \times a)} MII_{I_B} N_{B \times g} \text{ where}$$

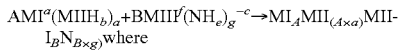

$$c = (3-e), D = \frac{(A \times a \times b) + (B \times e \times g)}{2}, \text{ and } g = \frac{f}{c},$$

and a, b, c, e, f, g, A and B, are selected so as to maintain electroneutrality. It should be noted that the byproduct compound $MI_A MII_{(A \times a)} MIII_B N_{(B \times g)}$ may thermodynamically favor decomposing into further smaller and/or distinct byproduct compounds. These further byproducts are formed of the same general constituents as the primary byproduct, but they have different valence states, atomic ratios, or stoichiometry, depending on the cationic species involved, as recognized by one of skill in the art. Such additional distinct byproduct compounds may include metal hydrides, which may slightly detract from the total amount of hydrogen generated designed as $DH_2$.

As previously discussed, in certain preferred embodiments a stable intermediate hydrogen storage compound is formed, which is expressed by the following reaction, proceeding by a similar reaction mechanism to the general reaction shown above:

$$AMI^a(MIIH_b)_a + BMIII^f(NH_e)_g{}^{-c} \rightarrow$$
$$M'_x M''_y N_z H_d \rightarrow MI_A MIII_{(A \times a)} MIII_B N_{(B \times g)} + DH_2$$

where

$$D = \left(\frac{d}{2}\right).$$

Although not wishing to be limited to any particular theory, a novel solid quaternary intermediate compound is known to occur where the metal hydride has one or more M' cations selected as Li, and generally believed to occur where M' is selected from the group consisting of: Li, Ca, Na, Mg, K, Be, and mixtures thereof, and where M" comprises a cation compound comprising a Group 13 element from the IUPAC Periodic Table. Where the novel SI hydrogen storage composition is formed, such a composition is represented by the general formula $M'_x M''_y N_z H_d$, where N is nitrogen and H is hydrogen. As can be observed in the mechanism above, such a compound undergoes a decomposition reaction mechanism, to form a dehydrogenated state where one or more decomposition byproducts, represented generally by the formula $MI_A MII_{(A \times a)} MIII_B N_{(B \times g)}$ are formed in addition to a hydrogen product, represented by the general formula, $DH_2$. It should be noted that the M' and M" are formed from the MI, MII, and MIII cations present in the reactants, and may comprise one or more cations, including mixtures thereof. Preferably, the MI and MIII cations are the same, and form the M'. Further, in preferred embodiments, x is greater than about 50 and less than about 53; y is greater than about 5 and less than about 34; z is greater than about 16 and less than about 45; d is greater than about 110 and less than about 177; it is preferred that x+y+z=100; and M', M", x, y, z, and d are selected so as to maintain electroneutrality of the compound.

Examples of preferred reactions according to the present invention which form a SI hydrogen storage composition comprise:

1) $LiBH_4 + 2\ LiNH_2 \rightarrow Li_3BN_2H_8 \rightarrow Li_3BN_2 + 4\ H_2$, which generates a theoretical 11.8 wt % hydrogen of the starting reactants, and a new stable intermediate hydrogen storage compound, $Li_3BN_2H_8$.
2) $LiAlH_4 + 2\ LiNH_2 \rightarrow Li_3AlN_2H_8 \rightarrow Li_3AlN_2 + 4\ H_2$, which generates a theoretical 9.5 wt % hydrogen of the starting reactants, and according to predicted thermodynamics favors forming a stable intermediate compound, $Li_3AlN_2H_8$.

Other non-limiting examples of alternate preferred embodiments according to the present invention where hydrogen generation occurs, and where a stable SI hydrogen storage composition although possible, is less favored to form, prior to the hydride generating reaction based on predicted thermodynamics, include the following exemplary reactions:

3) $NaBH_4 + 2\ NaNH_2 \rightarrow Na_3BN_2 + 4\ H_2$ which generates a theoretical 6.9 wt % hydrogen of the starting reactants, where a predicted intermediate compound is $Na_3BN_2H_8$.
4) $Mg(BH_4)_2 + 6\ MgNH \rightarrow 2\ Mg_3BN_3 + Mg + 7\ H_2$ which generates a theoretical 4.8 wt % of the starting reactants and forms two by-products of the cationic species: magnesium boroazide $Mg_3BN_3$ and magnesium Mg.
5) $Mg(BH_4)_2 + 6\ MgNH \rightarrow 2\ Mg_3BN_3 + MgH_2 + 6\ H_2$ which generates a theoretical 4.1 wt % hydrogen of the starting reactants and forms two by-products of the cationic species, magnesium boroazide $Mg_3BN_3$ and magnesium hydride $MgH_2$.
6) $Mg(BH_4)_2 + 2\ Mg(NH_2)_2 \rightarrow Mg_3B_2N_4 + 8\ H_2$ which generates a theoretical 9.6 wt % hydrogen of the starting reactants.
7) $Mg(BH_4)_2 + 4\ MgNH \rightarrow Mg_3B_2N_4 + 2\ MgH_2 + 4\ H_2$ which generates a theoretical 3.8 wt % hydrogen of the starting reactants.

In alternate preferred embodiments according to the present invention, the hydrogen generation reaction proceeds according to the reaction mechanism:

$$AMI^a(MIIH_b)_a + BMIII^f(NH_e)_g{}^{-c} + EMIIIIH_h \rightarrow MI_A$$
$$MII_{(A+a)}\ MIII_B MIIII_E N_{(B \times g)} + DH_2$$

where an additional reactant, a third composition (or second metal hydride ($MIIIIH_h$)) is present, and

$$c = (3-e), D = \frac{(A \times a \times b) + (B \times e \times g) + (E \times h)}{2}, \text{ and } g = \frac{f}{c}$$

and a, b, c, e, f, g, h, A, B, D, and E are selected so as to maintain electroneutrality. Examples of exemplary preferred reactions according to the above mechanism having a third reactant composition include:

8) $Mg(BH_4)_2 30\ 3\ Mg(NH_2)_2 + 2\ Mg \rightarrow 2\ Mg_3BN_3 + 10\ H_2$ which generates theoretical 7.4 wt % hydrogen of the starting reactants with additional magnesium added as a reactant, where an intermediate although possible is less favored by predicted thermodynamics to form, and a byproduct consisting mainly or solely of magnesium boroazide $Mg_3BN_3$ does form.

9) $Mg(BH_4)_2 + 3\ Mg(NH_2)_2 + 2\ MgH_2 \rightarrow 2\ Mg_3BN_3 + 12\ H_2$
which ge a theoretical 8.7 wt % hydrogen of the starting reactants (where an additional reactant is present, magnesium hydride $MgH_2$), and a byproduct consisting mainly of magnesium boroazide $Mg_3BN_3$ is favored to form.

Preferred conditions for reaction of the nitride compound with the metal hydride compound vary with respect to preferred temperature and pressure conditions for each independent reaction. However, it is preferred that the reaction is carried out as a solid state reaction, in a non-oxidizing atmosphere, essentially in the absence of oxygen, preferably in an inert atmosphere, such as under nitrogen or argon. Further, as will be discussed in more detail below, it is preferred that the solid nitride and metal hydride compounds are reduced in particle size from their starting size. In the case of the nitride, an average particle diameter size of less than about 3 μm is preferred, and for the metal hydride, an average particle diameter size of less than 25 μm (microns) and most preferably to less than 15 μm is desirable. The reduction of particle size may occur prior to conducting the reaction or concurrently to conducting the reaction between the compounds. In certain preferred embodiments, the reaction is carried out at ambient pressure at a temperature of about 85° C. or higher. However, as recognized by one of skill in the art, such temperatures and pressures are highly dependent on the reaction kinetics for each individual reaction.

With reference to the embodiment where the SI hydrogen storage composition (represented by the general formula $M'_xM''_yN_zH_d$) is formed, it is preferred in certain embodiments, that an alkali metal hydride is reacted with an alkali nitride. One preferred example is where the lithium is the alkali metal cationic species. The formula unit (and corresponding atomic ratios) of the intermediate compound is best expressed by $Li_xB_yN_zH_d$, where preferred ranges for x are greater than about 50 and less than about 53; preferred ranges for y are greater than about 5 and less than about 34, preferred ranges for z are greater than about 16 and less than about 45, and preferred ranges for d are greater than about 110 and less than about 177. Further, x, y, z, and d are selected so as to maintain the electroneutrality of the hydrogen storage intermediate compound. The SI hydrogen storage compound may be represented by the simplified general formula $Li_qB_rN_sH_t$, where the atomic ratios may be expressed by the following relationships: q/r is about 3; s/r is about 2; and t/r is about 8. Thus, the average atomic ratio of one preferred SI can be expressed by the nominal general formula $Li_3BN_2H_8$. In certain preferred embodiments of the present invention, the compounds which form the lithium SI compound are a lithium hydride reacted with a lithium nitride. Such lithium hydrides may include, for example, $LiAlH_4$, $LiH$, $LiBH_4$. Lithium nitrides may include and $LiNH_2$, $Li_3N$, $BNH_6$, and $LiN_3$.

In one preferred reaction, the reactants for the reaction forming the $Li_xB_yN_zH_d$ hydrogen storage composition are lithium amide compound and lithium borohydride compound. The preferred stoichiometry in the following reaction $A\ LiBH_4 + B\ LiNH_2 \rightarrow Li_xB_yN_zH_d$ is preferably a stoichiometric ratio of nitride to metal hydride (A:B) from between about 0.5 to about 3. Particularly preferred stoichiometric ratios of A:B are where A is about 1 and B is between about 2 to about 2.25, which corresponds to an x of about 50, a y of about 15 to about 17, a z of about 33 to about 35, and an d of about 130 to about 134. For this reaction, the temperature of formation at ambient pressure is from about 85° C. to about 95° C.

After the novel SI hydrogen storage composition is formed, it is a hydrogenated and stable material at ambient conditions. When release of the hydrogen is desired, the composition is heated to a temperature of about 170° C. at ambient pressure. The melting point of the hydrogen storage composition is about 210° C. at ambient pressure. Hydrogen release has been observed to occur much more rapidly when the SI hydrogen storage composition is in a liquid state, versus a solid or partially solid state, and thus according to the present invention, it is preferred that the compound is heated to above the melting point of the composition to rapidly release the hydrogen gas.

A first experiment was conducted according to a method of making a hydrogen storage compound according to a first preferred embodiment of the present invention, where a mixture of $LiBH_4$ and $LiNH_2$ of molar ratio 1:2 react according to the above described chemical reaction formula. The $LiBH_4$ is commercially available from Lancaster Synthesis, Inc. of Windham, N.H. (and is specified to be ≧95% purity) and the $LiNH_2$ is commercially available from Aldrich Chemical Co. of St. Louis, Mo. (also specified to be ≧95% purity). The starting powders are mixed in the molar ratio 1 $LiBH_4$:2 $LiNH_2$ and sealed into a hardened steel ball mill jar while inside an argon (Ar) inert atmosphere glove box. One large and two small steel balls are placed in the jar with the powder. The material is then high-energy ball milled for at least five hours using a SPEX 8000 mixer-mill. The resulting powder is $Li_3BN_2H_8$. After 16 hours of milling, the average particle size diameter of the compound(s) remaining in the mill were measured to be approximately 6 μm to about 11 μm.

In a second experiment according to an alternate preferred embodiment of the present invention, a method of making a hydrogen storage compound is provided, the ratio of reactants to one another is the same as described in the embodiment above. In the second experiment, the $LiBH_4$ is sealed into a steel ball mill jar along with one large and two small steel balls while inside an Ar inert gas glove box. The powder is then milled for 10 minutes using a SPEX 8000 mixer mill in order to reduce the average powder particle diameter size to about 6 μm to about 11 μm. The same process is used to separately mill $LiNH_2$ for 10 minutes for the same purpose, where the resulting particle size is about 1.5 μm to about 3 μm.

As observed by X-ray diffraction, no change in composition or crystal structure of either reactant occurs after milling the reactant by itself. The two pre-milled powders are then weighed out in the molar ratio 1 $LiBH_4$:2 $LiNH_2$ and once more sealed into a ball mill jar under Ar gas, but this time without including any balls. The jar is then agitated in the SPEX 8000 mixer-mill for 10 minutes. In the absence of milling balls, the only effect is to thoroughly homogenize the mixture of powders. X-ray diffraction performed after the mixing confirms that no transformation has occurred yet. The mixed powder is then heated above about 90° C. for a short time (less than 10 minutes) to convert it via reaction to $Li_3BN_2H_8$ powder.

FIG. 1 shows a high-resolution x-ray diffraction pattern (the x-ray "fingerprint") of the new quaternary hydride, or SI hydrogen storage composition, referred to generally as $Li_3BN_2H_8$ formed in the first experiment by ball milling for 16 hours. The vertical lines indicate the angles 2θ of the experimentally observed diffraction lines. There is one extraneous peak at about 2θ=21.3° due to a plastic film that was placed over the sample surface to prevent the sample from reacting with oxygen in the air. Evidence that this pattern represents a single unique phase comes from two observations. First, the same pattern of lines (both 2θ values and intensities) occurs for samples produced under a variety of experimental conditions. Second, preliminary analysis of the peak positions indicates that a single model for the crystal symmetry can explain all of the observed lines.

Figure 2:
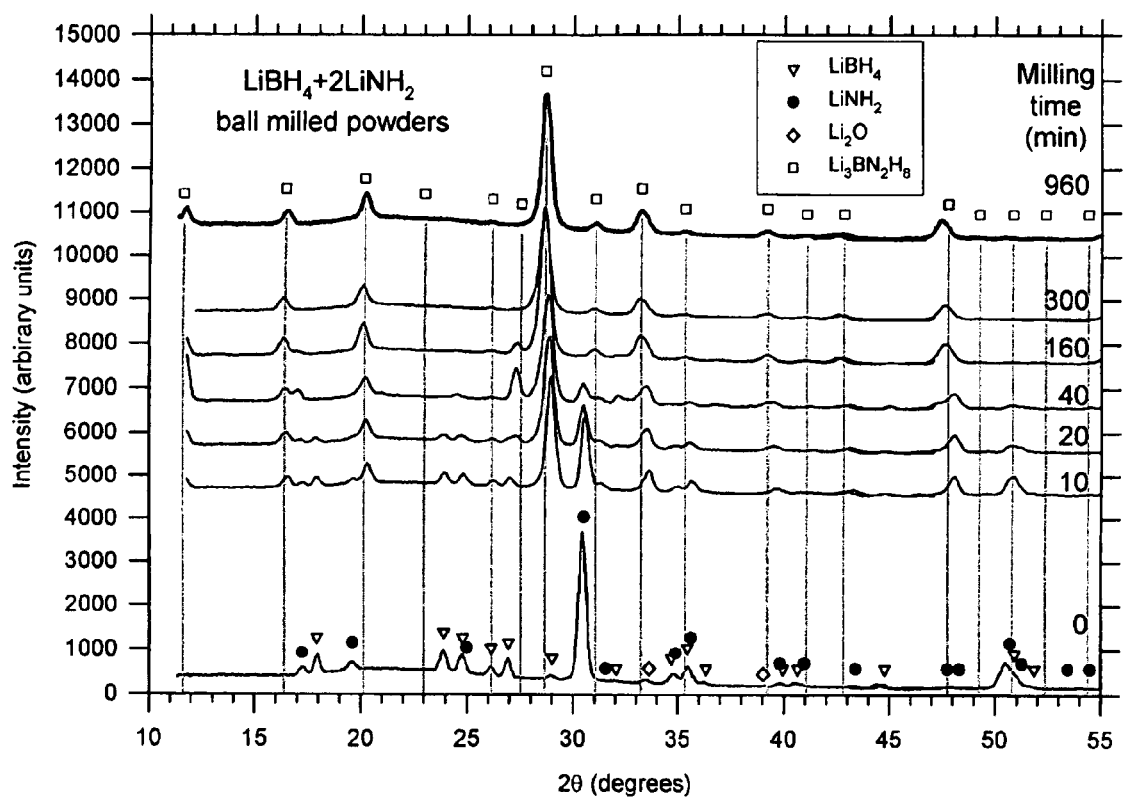
FIG. 2 shows x-ray diffraction patterns of a mixture of reactants milled according to the present invention compared with the new hydrogen storage compound.

FIG. 2 illustrates the effect of ball milling as performed in the first experiment on the x-ray diffraction pattern of the mixture $LiBH_4+2\ LiNH_2$. The lowest diffraction pattern, labeled "0" milling time, is for the starting mixture, and is comprised of lines characteristic of $LiBH_4$ (represented by inverted triangles) and $LiNH_2$ (represented by circles). A trace quantity of $Li_2O$ (represented by diamonds) is also present as an impurity. The center patterns show the evolution of the diffraction pattern with ball milling time, from 10 minutes of milling up to 300 minutes. Patterns for 80, 120, and 200 minutes have been omitted for clarity; they differ in only small details from the 160 minutes pattern. For comparison, the pattern obtained after much longer milling time, 960 minutes, is also shown, but it does not differ from the 300 minutes pattern, indicating that the transformation is complete after 300 minutes. The squares, together with the vertical gray lines, indicate the positions of the diffraction lines for $Li_3BN_2H_8$ obtained from the x-ray diffraction analysis of FIG. 1.

As milling proceeds, the diffraction pattern of $LiBH_4$ weakens (best observed from the quartet of lines between 24° and 27°), as does the pattern for $LiNH_2$ (seen from the main peak at 30.5°). Concurrently the pattern for $Li_3BN_2H_8$ emerges. As the transformation proceeds there are small changes in the positions and intensities of the $Li_3BN_2H_8$ lines (for example, the main peak at 28.7°) indicating that the details of the underlying crystal structure also evolve with milling. The $Li_2O$ content is essentially unchanged, but the $Li_3BN_2H_8$ lines obscure its diffraction lines. In summary, x-ray diffraction shows that ball milling of $LiBH_4$ and $LiNH_2$ (in a 1:2 molar ratio) induces a transformation to the new hydrogen storage compound, which is a quaternary hydride phase $Li_3BN_2H_8$.

Figure 3:
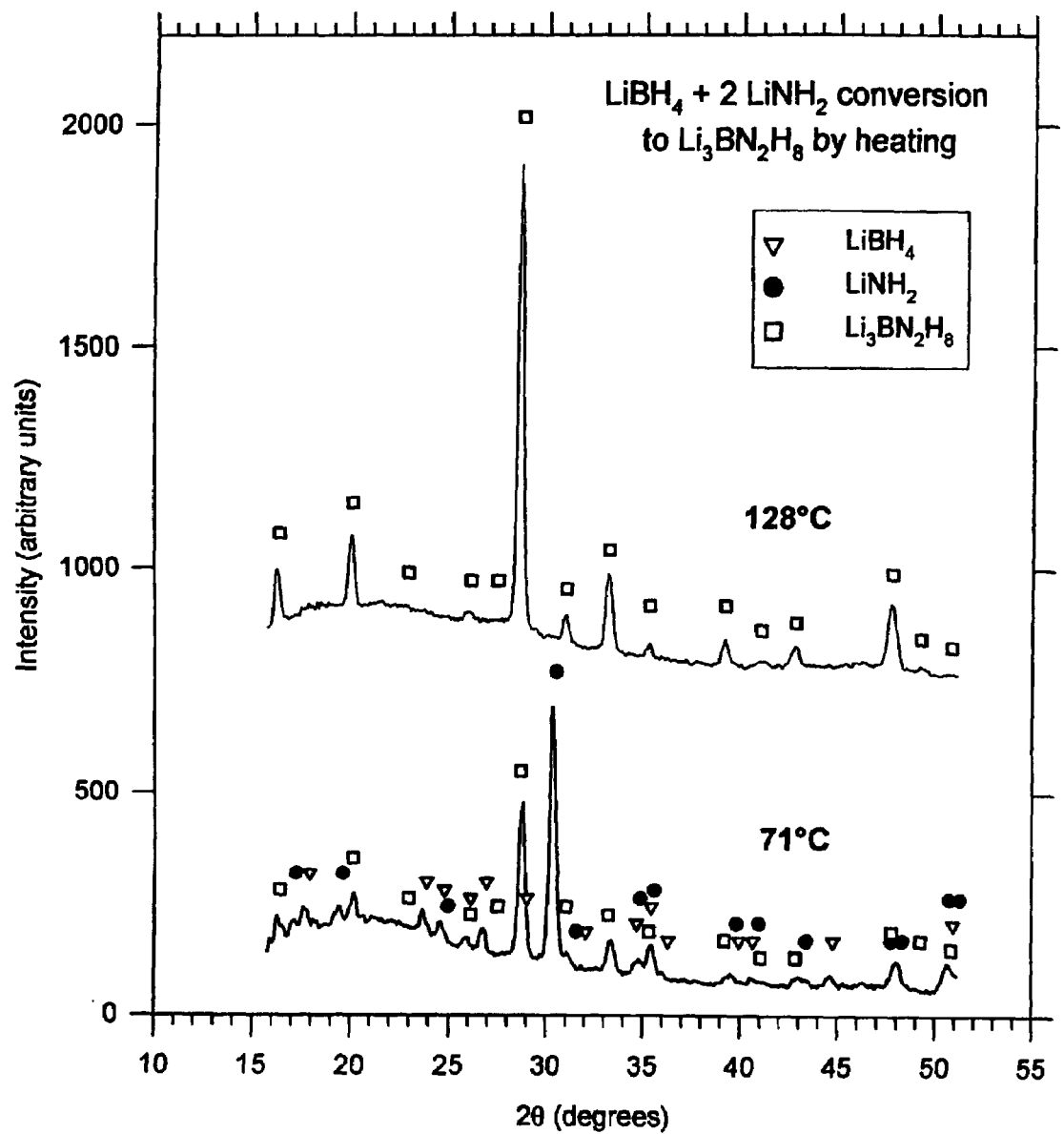
FIG. 3 shows x-ray diffraction patterns of starting reactants compared with the new hydrogen storage compound.

FIG. 3 shows the effect of heating on the sample mixture from the second experiment comprising $LiBH_4$ and 2 $LiNH_2$. The mixture transforms to $Li_3BN_2H_8$ when it reaches a temperature of about 90° C. Shown are characteristic diffraction patterns obtained below (71° C.) and above (128° C.) the transformation temperature. The original sample from the second experiment was a mixture of premilled $LiBH_4$ and $LiNH_2$. First the $LiBH_4$ and the $LiNH_2$ were prepared in accordance with the second embodiment described above, where each reactant was milled separately for 10 minutes to reduce the particle size, and then mixed without grinding media for an additional 10 minutes to homogenize the mixture. The mixture was then stored in an Ar inert atmosphere glove box at room temperature for 10 days. The mixture formed the sample for the heat treatment experiment used for the results shown in FIG. 3, and contains a substantial quantity of $Li_3BN_2H_8$ in addition to the original $LiBH_4$ and $LiNH_2$, as shown by the 71° C. diffraction pattern in FIG. 3 (the room temperature diffraction pattern is essentially identical to the 71° C. pattern). Although not limiting to the mechanism by which the present invention operates, this implies that the mixed reactant powders ($LiBH_4+2\ LiNH_2$) are slowly converting to $Li_3BN_2H_8$ at room temperature. When heated to temperatures above 90° C., the sample converts entirely to the $Li_3BN_2H_8$ phase, as shown by the 128° C. diffraction pattern.

From the temperature evolution of the diffraction pattern, the transformation occurs between about 85° C. to about 95° C., and the duration for complete transformation was less than 10 min.

Figure 4:
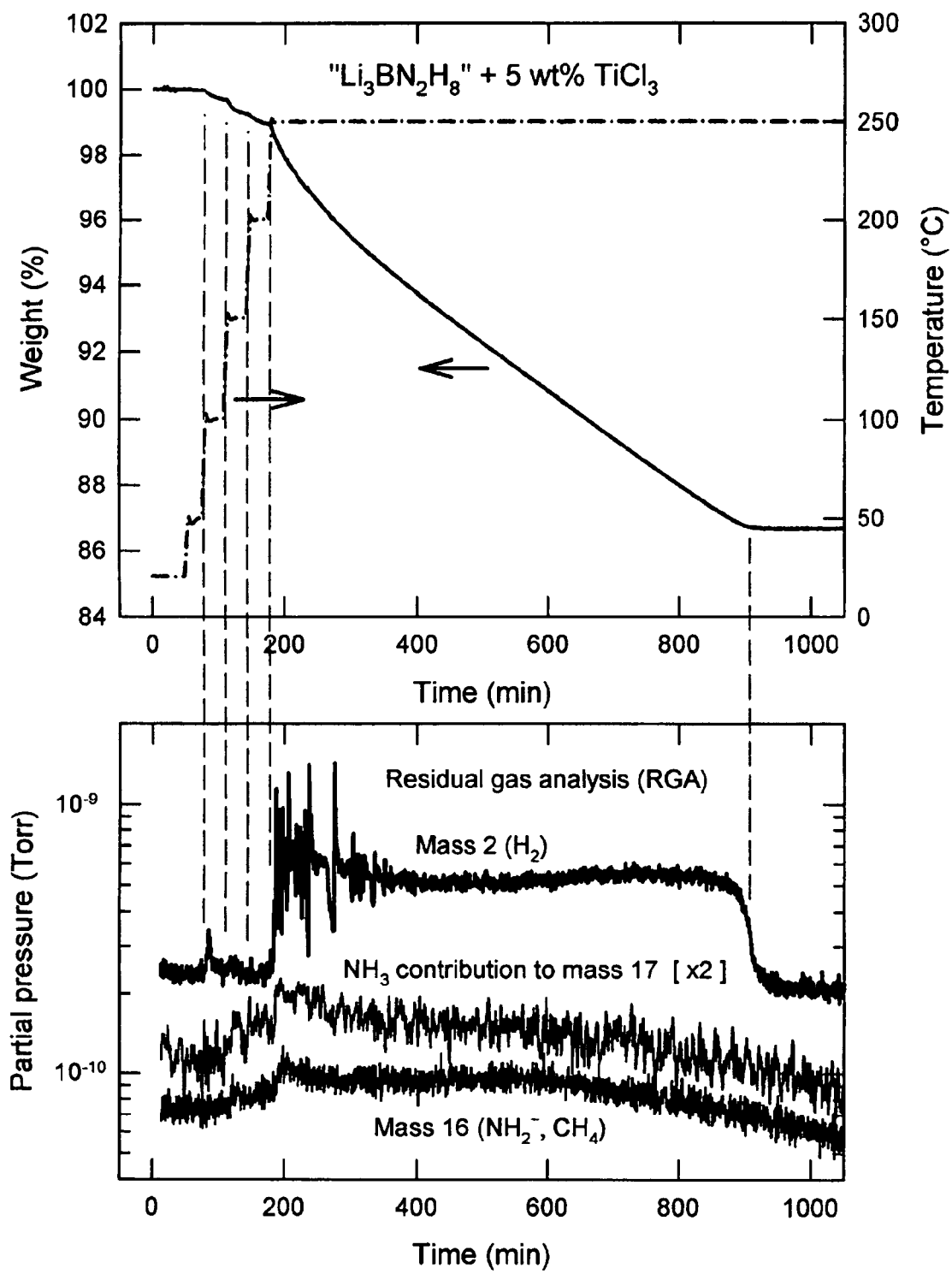
FIG. 4 shows thermogravimetric analysis (TGA) of the weight loss of the new hydrogen storage compound versus time as temperature is increased to 250° C. and then held constant, combined with residual gas analysis (RGA) data obtained with a mass spectrometer monitoring the exhaust gas from the TGA.

FIG. 4 shows a thermogravimetric analyzer (TGA) analysis with a coinciding residual gas analysis (RGA) obtained with a mass spectrometer monitoring the exhaust gas from the TGA. The upper panel of FIG. 4 shows hydrogen release by weight loss as a function of time for a sample of $Li_3BN_2H_8$. The sample used to develop FIG. 4 is from a third experiment, where the sample of a stable quaternary hydride hydrogen storage compound is formed by mixing $LiBH_4$:$LiNH_2$ in the ratio 1:2 (having 5 wt % $TiCl_3$ as an inert impurity). The mixed powder was ball milled using a SPEX 8000 mixer-mill for 10 minutes. X-ray diffraction showed the as-milled powder to consist mostly of the $Li_3BN_2H_8$ phase, with some retained $LiBH_4$ and $LiNH_2$. Other experiments have shown that the remaining $LiBH_4$ and $LiNH_2$ will convert to $Li_3BN_2H_8$ upon heating above 90° C. Although $TiCl_3$ sometimes acts as a catalyst for some hydrogen storage materials, such as $NaAlH_4$, the $TiCl_3$ appears to be completely inert in the $LiBH_4$-$LiNH_2$ system.

The sample was heated in steps of 50° C. to 250° C. (represented by the dash-dot line). At 250° C. the sample lost weight continuously over time until the total weight loss reached 13.3 wt %, at which point the weight loss stopped abruptly. The weight loss is slightly larger than the theoretical hydrogen content of the sample (11.3 wt %). Although not wishing to be bound by any particular theory, the greater weight loss may be attributed to decomposition of one or more of the impurity phases present in about 5% levels in the starting materials, or possibly due to a slight loss of nitrogen due to producing a small amount of ammonia $NH_3$, or both.

As shown in the lower panel of FIG. 4, the RGA signals are depicted for mass 2 ($H_2$), mass 17 ($NH_3$), and mass 16 (a "crack" of $NH_3$ corresponding to $NH_2^-$). The estimated contribution to mass 17 due to a crack of $H_2O$ corresponding to $OH^-$ has been subtracted from the mass 17 signal. Also the mass 17 signal has been shifted upward (multiplied by 2 on a log scale) purely for display purposes to separate it from the mass 16 signal. The signal near time t=0 represents the background signal from the RGA in the absence of these mass species in the sampled gas. Starting at 100° C., heating is accompanied by bursts of evolved gas identified as a mixture of $H_2$ and $NH_3$. At 250° C. almost all of the evolved gas is $H_2$. The abrupt end of weight loss after 900 minutes is strongly correlated with the sudden shutoff of the $H_2$ signal in the RGA, clearly demonstrating that the bulk of the evolved gas is hydrogen.

Figure 5:
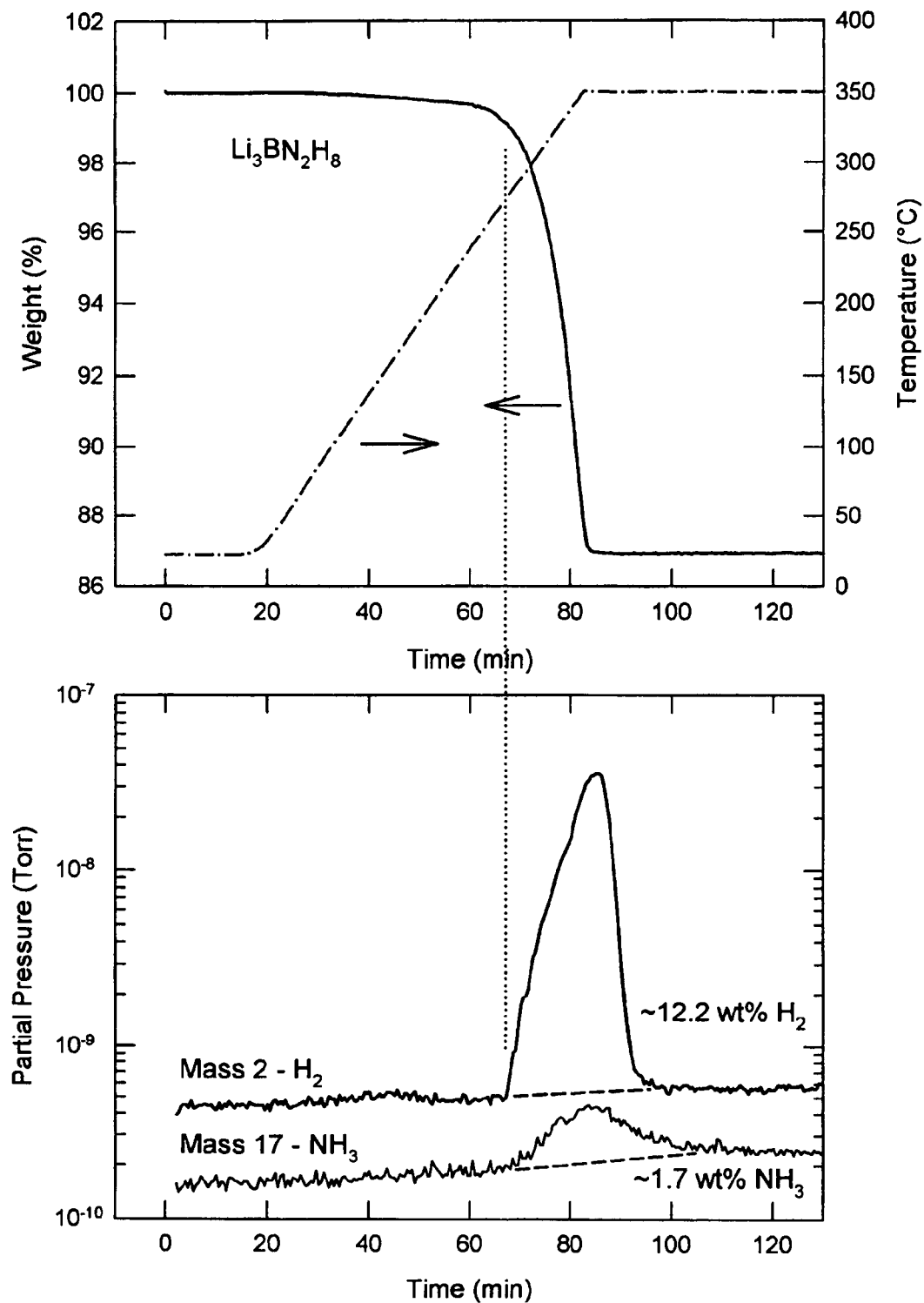
FIG. 5 shows another TGA of the new hydrogen storage compound, where heat is applied at a constant rate of 5° C. per minute while an RGA monitors the evolved gas.

FIG. 5 shows an alternative TGA measurement in which a sample of $Li_3BN_2H_8$ (without the additive $TiCl_3$) is heated to 350° C. at a constant rate of 5° C. per minute. The RGA was used to monitor the composition of the exhaust gas and identify the evolved gas species, as shown in the lower panel of FIG. 5, which corresponds to the time frame of the upper panel. The correlation between the TGA and RGA again demonstrates that the sample simultaneously evolved both $H_2$ and $NH_3$ gas. The results indicate that rapid weight loss starts at temperatures of around 275° C., but this is an upper limit since there is a time delay of up to several minutes between the actual emission of the gas by the sample inside the TGA, and its appearance in the exhaust gas stream where it is detected by the RGA. Semiquantitative analysis of the RGA signals estimates that the total weight loss due to $H_2$ is about 12.2 wt % (in reasonable agreement with the theoretical hydrogen content of 11.9 wt %) and about 1.7 wt % $NH_3$.

Although the reversibility of the reaction does not appear to presently occur at a sufficient rate for suitable temperature and pressure conditions desirable for a commercial embodiment, incorporating a catalyst is one known method to both reduce the hydrogen release temperature and facilitate reabsorption of hydrogen in other prior art hydrogen storage materials. Thus, the present invention contemplates employing such a catalyst, as known to one of skill in the art, to facilitate reversibility at desirable conditions and rates. Catalysts that may be useful with the present invention, include, for example, the following non-limiting list: Fe, Ni, Co, Pt, Pd, Sr, and compounds and mixtures thereof.

Thus, the hydrogen storage materials according to the present invention provide a novel stable solid phase hydrogen storage composition material, which is especially advantageous in fuel cell applications. The reaction to generate hydrogen is readily controlled by temperature and pressure, and the solid phase is capable of storing hydrogen for prolonged periods at moderate conditions. Further, the methods of the present invention provide a method of releasing hydrogen from solid materials, which can be controlled both by limiting when the reactants are mixed, or under which conditions (e.g. temperature, pressure, and reactant particle size) the reactants are mixed, to provide a controlled hydrogen release from solid phase hydrogen storage materials.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydrogen storage composition comprising:

$$M'_xM''_yN_zH_d$$

wherein
(a) M' is a cation selected from the group consisting of: Li, Ca, Na, Mg, K, Be, and mixtures thereof and x is greater than about 50 and less than about 53;
(b) M" comprises a cation composition comprising a Group 13 element of the Periodic Table and y is greater than about 5 and less than about 34;
(c) N is nitrogen and z is greater than about 16 and less than about 45;
(d) H is hydrogen and in a fully hydrogenated state, d is greater than about 110 and less than about 177; and
(e) wherein M', M", x, y, z, and d are selected so as to maintain electroneutrality.

2. The hydrogen storage composition according to claim 1 wherein hydrogen is released from the storage composition in a fully hydrogenated state to form a composition represented by the general formula $M'_xM''_yN_z$, where x is greater than about 50 and less than about 53; y is greater than about 5 and less than about 34; and z is greater than about 16 and less than about 45.

3. The hydrogen storage composition according to claim 1 wherein the storage composition is formed by reacting a hydride represented by the general formula $MI_a(MIIH_b)_c$ with a nitride represented by the general formula $MIII^f(NH_e)_g^{-c}$; and wherein a, b, c, e, f, and g are selected so as to maintain electroneutrality.

4. The hydrogen storage composition according to claim 3 wherein the storage composition is formed by a reaction between said hydride and said nitride, as represented by the reaction formula:

$$AMI^a(MIIH_b)_a + BMIII^f(NH_e)_g^{-c} \rightarrow M'_xM''_yN_zH_d$$

wherein M' comprises MI and MIII and M" comprises MII, wherein x is equal to (A+B), y is equal to a, z is equal to (B×g), and d is equal to ((A×a×b)+(B×e×g)).

5. The hydrogen storage composition according to claim 4 wherein A is about 1 and B is from between about 0.5 to about 3.

6. The hydrogen storage composition according to claim 4 wherein A is about 1 and B is from between about 2 to about 2.25.

7. The hydrogen storage composition according to claim 4 wherein said nitride is lithium amide represented by the formula $LiNH_2$ and said hydride is lithium borohydride represented by the formula $LiBH_4$.

8. The hydrogen storage composition according to claim 4 wherein said nitride is lithium amide represented by the formula $LiNH_2$, said hydride is lithium aluminum hydride represented by the formula $LiAlH_4$.

9. The hydrogen storage composition according to claim 4 wherein the composition releases hydrogen by the following reaction:

$$M'_xM''_yN_zH_d \rightarrow MI_AMII_{(A \times a)}MIII_BN_{(B \times g)} + DH_2$$

wherein M' comprises MI and MIII; M" comprises MII;

$$D = \left(\frac{d}{2}\right),$$

and a, x, y, z, d, A and B are selected so as to maintain electroneutrality.

10. The hydrogen storage composition according to claim 1 wherein the hydrogen storage composition comprises a single phase.

11. The hydrogen storage composition according to claim 1 wherein the hydrogen storage composition is a compound.

12. The hydrogen storage composition according to claim 1 wherein the composition is expressed by the nominal general $Li_qB_rN_sH_t$ wherein the atomic ratio of q/r is about 3; s/r is about 2; and t/r is about 8.

13. The hydrogen storage composition according to claim 12 wherein the composition comprises $Li_3BN_2H_8$.

14. A method of storing hydrogen comprising:
reacting a nitride having one or more cations other than hydrogen with a hydride represented by $MI^a(MIIH_b)_a$, wherein MI represents a first cationic species other than hydrogen, MII represents a second cationic species other than hydrogen which is distinct from said first cationic species, wherein a and b are selected so as to maintain electroneutrality and $$\left(\frac{b \times a}{1+a}\right)$$

represents a ratio of hydrogen to cationic species present in the hydride,
wherein said reacting forms a hydrogen storage composition comprising hydrogen, nitrogen, and at least one cation selected from the group consisting of said one or more cations other than hydrogen derived from said nitride and at least one cation selected from the group consisting of MI and MII derived from said hydride.

15. The method according to claim 14 wherein said hydrogen storage composition releases hydrogen by reacting to form a hydrogen product and one or more byproduct compositions comprising: nitrogen and at least one of said one or more cations other than hydrogen derived from said nitride and MI and MII derived from said hydride, respectively.

16. The method according to claim 14 wherein MI comprises a cation selected from the group consisting of: Li, Ca, Na, Mg, K, Be and mixtures thereof; and MII comprises a cation comprising a Group 13 element of the Periodic Table.

17. The method according to claim 14 wherein said nitride is represented by $MIII^f(NH_e)_g^{-c}$, wherein MIII represents at least one cationic species other than hydrogen, f represents an average valence state of MIII, c=(3−e), $$g = \frac{f}{c} \text{ and } (e \times g)$$

represents an atomic ratio of hydrogen to cationic species present in said nitride.

18. The method according to claims 17 wherein MIII comprises a cation selected from the group consisting of: Li, Ca, Na, Mg, K, Be, and mixtures thereof.

19. The method according to claim 14 wherein said hydride is selected from the group of compounds consisting of: lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), and mixtures thereof.

20. The method according to claim 14 wherein said nitride is selected from the group of compounds consisting of: lithium amide ($LiNH_2$), sodium amide ($NaNH_2$), magnesium amide ($Mg(NH_2)_2$), $Li_3N$ (lithium nitride), magnesium imide (MgNH), borazane ($BNH_6$), lithium azide ($LiN_3$), and mixtures thereof.

21. The method according to claim 14 wherein said nitride is lithium amide represented by the formula $LiNH_2$ and said hydride is lithium borohydride represented by the formula $LiBH_4$.

22. The method according to claim 14 wherein said nitride is lithium amide represented by the formula $LiNH_2$, said hydride is lithium aluminum hydride represented by the formula $LiAlH_4$.

23. The method according to claim 14 wherein said reacting is conducted in an inert atmosphere.

24. The method according to claim 14 wherein prior to said reacting, reducing said nitride to an average particle diameter size of less than about 3 μm.

25. The method according to claim 14 wherein prior to said reacting, reducing said hydride to an average particle diameter size of less than about 25 μm.

26. The method according to claim 14 wherein said reacting is conducted at a temperature of about 85° C. or greater.

27. The method according to claim 14 wherein said reacting is conducted in a milling process, wherein said nitride and said hydride are milled to reduce particle size and provide energy sufficient for said reacting of said nitride with said hydride.

28. A method of releasing hydrogen comprising:
reacting a hydrogen storage nitride composition having one or more cations other than hydrogen with a hydrogen storage hydride composition represented by $MI^a(MIIH_b)_a$, wherein MI represents a first cationic species other than hydrogen, MII represents a second cationic species other than hydrogen which is distinct from said first cationic species, wherein a and b are selected so as to maintain electroneutrality and $$\left(\frac{b \times a}{1 + a}\right)$$

represents an atomic ratio of hydrogen present to cationic species in said hydride composition, wherein said reacting releases hydrogen and forms one or more byproduct compounds comprising: nitrogen and at least one cation selected from the group consisting of said one or more cations other than hydrogen derived from said nitride composition and at least one cation selected from the group consisting of MI and MII derived from said hydride composition.

29. The method according to claim 28 wherein said nitride composition is represented by $MIII^f(NH_e)_g^{-c}$, wherein MIII represents at least one cationic species other than hydrogen, f represents an average valence state of MIII, c=(3−e), $$g = \frac{f}{c} \text{ and } (e \times g)$$

represents an atomic ratio of hydrogen to cationic species present in said nitride composition.

30. The method according to claim 29 wherein said MI, MII, and MIII are each cations independently selected from the group consisting of: $CH_3$, Al, As, B, Ba, Be, Ca, Cd, Ce, Cs, Cu, Eu, Fe, Ga, Gd, Ge, Hf, Hg, In, K, La, Li, Mg, Mn, Na, Nd, Ni, Pb, Pr, Rb, Sb, Sc, Se, Si, Sm, Sn, Sr, Th, Ti, Tl, W, Y, Yb, Zn, Zr, and mixtures thereof.

31. The method according to claim 28 or 29 wherein MI or MIII comprises an element selected from the group consisting of: Al, B, Li, Na, K, Be, Mg, Ca, Sr, and mixtures thereof.

32. The method according to claim 28 wherein MI is selected from the group consisting of: Al, B, Ca, Li, Mg, Na and mixtures thereof.

33. The method according to claim 28 wherein MII comprises an element independently selected from the group consisting of: Al, B, Ca, Li, Na, Mg and mixtures thereof.

34. The method according to claim 29 wherein said hydride composition is selected from the group of compositions consisting of: lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), and mixtures thereof.

35. The method according to claim 28 wherein said nitride composition is selected from the group of compositions consisting of: lithium amide ($LiNH_2$), sodium amide ($NaNH_2$), magnesium amide ($Mg(NH_2)_2$), $Li_3N$ (lithium nitride), magnesium imide (MgNH), borazane ($BNH_6$), lithium azide ($LiN_3$), and mixtures thereof.

36. The method according to claim 28 wherein said nitride composition is lithium amide ($LiNH_2$) and said hydride composition is lithium borohydride ($LiBH_4$).

37. The method according to claim 28 wherein said nitride composition is lithium amide ($LiNH_2$) and said hydride composition is lithium aluminum hydride ($LiAlH_4$).

38. The method according to claim 28 wherein said reacting is represented by the general formula $$AMI^a(MIIH_b)_a + BMIII^f(NH_e)_g^{-c} \rightarrow MI_A MII_{(A \times a)} MII_B N_{(B \times g)} + DH_2,$$

where c=(3−e), $$D = \frac{(A \times a \times b)+(B \times e \times g)}{2}, \text{ and } g = \frac{f}{c},$$

and a, b, c, e, f, g, A and B, are selected so as to maintain electroneutrality.

39. The method according to claim 38 wherein said MI, MII, or MIII is selected from the group consisting of: $CH_3$, Al, As, B, Ba, Be, Ca, Cd, Ce, Cs, Cu, Eu, Fe, Ga, Gd, Ge, Hf, Hg, In, K, La, Li, Mg, Mn, Na, Nd, Ni, Pb, Pr, Rb, Sb, Sc, Se, Si, Sm, Sn, Sr, Th, Ti, Tl, W, Y, Yb, Zn, Zr, and mixtures thereof.

40. The method according to claim 38, wherein said reacting is represented by the general formula $AMI^a(MIIH_b)_a + BMI^f(NH_e)_g{}^{-c} + EMIIIIH_h \rightarrow MI_A$
$MII_{(A \times a)}MIII_BMIIII_EN_{(B \times g)} + DH_2$ wherein a third composition $MIIIIH_h$ is present as a reactant and c=(3−e),

, and $g = \frac{f}{c}$ and a, b, c, e, f, g, h, A, B, and E are selected so as to maintain electroneutrality.

41. The method according to claim 40 wherein MIII of said third composition represents a cationic species other than hydrogen and h represents an atomic ratio of hydrogen in said third composition, wherein h is from 0 to about 2.

42. The method of claim 40 wherein said third composition is selected from the group consisting of: $MgH_2$, Mg, and mixtures thereof.

43. The method according to claim 28 wherein said reacting is conducted in an inert atmosphere.

44. The method according to claim 28 wherein prior to said reacting, reducing said nitride composition to an average particle diameter size of less than about 3 μm.

45. The method according to claim 28 wherein prior to said reacting, reducing said hydride composition to an average particle diameter size of less than about 25 μm.

46. The method according to claim 28 wherein prior to said reacting, reducing said nitride composition and said hydride composition to an average particle diameter size of less than about 15 μm.

47. The method according to claim 28 wherein said reacting is conducted at a temperature of at least about 85° C.

48. The method according to claim 28 wherein said reacting is conducted in a milling process, wherein said nitride composition and said hydride composition are milled to reduce particle size and generate energy sufficient to facilitate said reacting of said nitride composition with said hydride composition.

49. The method according to claim 28 wherein said reacting to release hydrogen is conducted at about 170° C. or greater.

50. The method according to claim 28 wherein said reacting to release hydrogen is conducted at about 210° C. or greater.

* * * * *